[United States Patent Office — 2,911,309 — Patented Nov. 3, 1959]

2,911,309
RUST PREVENTIVE COMPOSITIONS

Harry W. Rudel, Roselle, and William Seitz, Union, N.J., assignors to Esso Research and Engineering Company, a corporation of Delaware No Drawing. Application April 25, 1957
Serial No. 655,016

9 Claims. (Cl. 106—14)

This invention relates to water displacing agents and their use in rust preventive compositions. Particularly, the invention relates to rust preventive compositions containing esters of: glycols and polyglycols; and esters of: monoethers of said glycols and polyglycols, as water displacing agents which increase the effectiveness of the rust preventive composition when applied to a wet surface.

Frequently, the metal parts to be protected from corrosion are coated with an undesirable film of water which may come from cooling or cutting fluids, rinsing baths, etc. during manufacturing operation, or from condensation of water vapor from the atmosphere, etc. This moisture must either be removed or displaced from direct contact with the metal surface in order for a rust preventive composition to be most effective. A common method of removing the water film is to pass the metal parts through a heated drying oven prior to the application of the rust preventive. However, this process is both slow and expensive. A more efficient and desirable method is to embody into the rust preventive composition a material which will preferentially adsorb onto the metallic surface thereby displacing any residual moisture and permitting a continuous rust preventive coating.

The esters, useful as water displacing agents in the composition of the invention, have the general formula:

$$RCOO(R'O)_nR''$$

wherein R is hydrogen or a methyl radical; R' is an aliphatic hydrocarbon group of 2 to 4 carbon atoms, such as ethylene, n-propylene, isopropylene, etc.; n is an integer of 1 to 8, e.g. 1 to 3; and R'' is hydrogen, or a $C_1$ to $C_8$, e.g. $C_1$ to $C_4$, alkyl radical, or —OCR wherein R is the same as above, i.e. hydrogen or a methyl radical. Such materials will include mono and diesters of glycols and polyglycols such as: ethylene glycol monoacetate, ethylene glycol diacetate, propylene glycol monoacetate, diethylene glycol diacetate, tetraethylene glycol monoacetate, tripropylene glycol monoacetate, dibutylene glycol monoacetate, diethylene glycol monoformate, etc.; and monoesters of glycol ethers and polyglycol ethers such as: mono-n-butyl ether of diethylene glycol acetate, monotertiary octyl ether of diethylene glycol acetate, monoethyl ether of tripropylene glycol acetate, monoethyl ether of ethylene glycol acetate, butoxy tripropylene glycol acetate, etc.

Since rust preventive compositions are frequently applied by dipping the metal parts to be protected into a bath or dip tank, the more water-soluble esters are more quickly leached out of the rust preventive composition by the incoming water and will collect in the water layer at the bottom of the tank where their usefulness is lost. For this reason, particularly preferred esters of the above type are those which have a limited solubility in water, such as those esters which are soluble in water at 20° C. in amounts of about 1 to 40, e.g. 6 to 25 weight percent.

The water displacing materials may be blended in fluid type rust preventive compositions in proportions ranging from about 0.1 percent to 10.0 percent, e.g. 1.0 percent to 5.0 percent by weight, based on the total composition. The fluid type rust preventive composition will generally comprise a solvent, a rust preventive agent, and frequently will contain waxes to aid in forming a protective film. Additional additives, such as anti-oxidants, metal deactivators, dyes, etc. are also frequently present in rust preventive compositions.

The solvent or oleaginous-base material of the composition may be volatile or non-volatile and generally is a mineral oil product such as: Stoddard solvent; naphthas, preferably naphthas having initial boiling points of about 180° F. to 310° F., and final boiling points of about 210° F. to 500° F.; gas oil; lubricating oil, preferably having a viscosity of about 35 to 1000 S.S.U. at 210° F.; petrolatum; etc. Vegetable, animal or synthetic oils may also be used, as well as mixtures of any of the above solvent materials.

Many different types of oil soluble rust preventive agents are used. One type includes $C_{12}$ to $C_{22}$ fatty acid partial esters of aliphatic polyhydric alcohols having about 3 to 12, preferably 3 to 8, carbon atoms. Examples of these partial esters are: sorbitan monooleate, glyceryl monooleate, pentaerythritol monooleate; the dioleates of sorbitan, mannitan, pentaerythritol and related polyhydric alcohols; the corresponding partial stearic and palmitic acid esters of these alcohols; and partial esters of these alcohols made from mixtures of these fatty acids. Another class of rust preventive agents are the oil soluble sulfonate soaps, preferably of alkali or alkaline earth metals, such as barium, calcium or sodium salts of petroleum sulfonic acids or alkyl aryl sulfonic acids, said sulfonic acids having average molecular weights of about 350 to 520. Still other useful additives in rust preventive compositions are oxidized wax esters, metal xanthates, metal phenolates, metal phenol sulfides, metal naphthenates, metal organo phosphates and thiophosphates, vegetable and animal fatty oils, etc. Wool grease (degras) is a particularly suitable additive when a residual coating which will adhere well to metal is desired. Also mixtures of the above types of rust inhibitors are desirable in some cases. For example, metal sulfonates of the types mentioned are particularly desirable in combination with the partial esters of pentaerythritol in rust preventive coating compositions.

As previously mentioned, waxes may be used in the rust preventive composition for the purpose of forming a heavier film on the surface to be protected. These waxes may be crystalline or microcrystalline and may be derived from animal, vegetable or mineral origins or may be synthetic waxes. However, the most important of these waxes are the paraffin waxes derived from petroleum. These paraffin waxes may be either normal or isoparaffin and preferably have melting points of about 100 to 200° F.

In general, the compositions of the invention will comprise by weight a major amount of an oleaginous base as solvent, such as 60 to 99 parts, e.g. 80 to 96 parts, a minor amount, usually about .5 to 30 parts, preferably about 3 to 20 parts, of a rust preventive agent, and about .1 to 10, preferably 1 to 5 parts by weight of a water displacing agent. Waxes in amounts of about 1 to 40, preferably 1 to 15 parts, may be added where a heavier residual coating is desired, while 1 to 15, preferably 2 to 10 parts of degras may be added to improve metal adhesion. All of above-said parts, being parts by weight.

EXAMPLE I

A series of rust preventive compositions embodying several of the water displacing agents of the invention were prepared by simple mixing of the components at room temperature until a solution was obtained. These compositions consisted of: 2 weight percent of water displacing agent; 10 weight percent of a sulfonate concentrate which consisted of 50 weight percent of sodium soap of a petroleum sulfonic acid, said acid having an average molecular weight of 465, and 50 weight percent of a mineral oil having a viscosity at 100° F. of 100 S.S.U.; 10 weight percent of neutral degras; and 78 weight percent of a hydrocarbon solvent naphtha having a flash point of 105° F., an initial boiling point of 320° F., a mid boiling point of 335° F. and a final boiling point of 390° F. These compositions were then evaluated according to the "Water Displacement" test described in U.S. Government Specification MIL-L-644A. Briefly described, this test is carried out as follows:

Two inch by three inch sandblasted panels of mild steel are dipped in water to deposit a water film over the panel. The wetted panel is then submerged in the test blend for 15 seconds without agitation. The panel is then stored in a humidity cabinet in an upright position for 1 hour at a temperature of 77° F. and at a relative humidity of 100 percent. At the end of this time, the panel is rinsed in heptane and examined for rust and discoloration.

The compositions tested and the results obtained are summarized in the following table.

Table I

| Water Displacing Agent in Composition | Solubility of Water Displacing Agent in Water (Wt. percent at 20° C.) | Amount of Rust | Rate or Displacing |
|---|---|---|---|
| None | | Rusted | Not Displaced. |
| Ethylene Glycol Diacetate | 16.4 | None | Very rapid. |
| Monoethyl Ether of Ethylene Glycol Acetate | 22.9 | None | Rapid. |
| Mono-n-Butyl Ether of Diethylene Glycol Acetate | 6.5 | None | Moderate. |

As seen from the above table the water displacing agents of the invention, were very effective in enhancing the effectiveness of the base rust preventive composition when applied to wet surfaces.

Other compositions (in parts by weight) further illustrating the invention and which may be prepared are summarized in the following table.

Table II

| | A | B | C | D |
|---|---|---|---|---|
| Rust Preventive Agent: | | | | |
| Sodium Petroleum Sulfonate (Mol. Wt. of Sulfonic Acid—457) | | | 5.0 | |
| Barium Petroleum Sulfonate (Mol. Wt. of Sulfonic Acid—460) | 3.0 | | | 3.0 |
| Sorbitan Monooleate | | 5.0 | | |
| Glyceryl Monooleate | | | | 1.0 |
| Oleic Acid | 0.5 | | | |
| Film Formers: | | | | |
| 135/137 EMP (English Melting Point) Refined Paraffin Wax | 1.5 | 5.0 | | |
| Neutral Degras | | | 10.0 | |
| Solvent: | | | | |
| Naphtha (Flash Point 105° F., MBP—335° F., FBP—390° F.) | 85.0 | 77.0 | 78.0 | |
| Mineral Lubricating Oil (70 SUS at 100° F.) | 3.0 | 10.0 | 5.0 | 91.0 |
| Mineral Lubricating Oil (200 SUS at 210° F.) | 4.0 | | | |
| Water Displacing Agent: | | | | |
| Ethylene Glycol Diacetate | | 3.0 | 2.0 | |
| Tripropylene Glycol Monoacetate | | | | 5.0 |
| Monobutyl Ether of Diethylene Glycol Formate | 3.0 | | | |

What is claimed is:
1. A rust inhibiting water displacing composition consisting essentially of a major proportion of a mineral oil, an oil soluble rust preventive in amounts of about 0.5 to 30 parts by weight of total composition selected from the group consisting of $C_{12}$ to $C_{22}$ fatty acid partial esters of aliphatic polyhydric alcohols having about 3 to 12 carbon atoms, alkali and alkaline earth metal salts of petroleum sulphonic acids, and alkyl aryl sulphonic acids having average molecular weights of about 350 to 520, and a water displacing agent in amounts of about 0.1 to 10 parts by weight of total composition having the formula:

$$RCOO(R'O)_nR''$$

wherein R is selected from a group consisting of hydrogen and methyl radicals, R' is a $C_2$ to $C_4$ aliphatic hydrocarbon radical, $n$ is about 1 to 8, and R'' is selected from a group consisting of hydrogen, $C_1$ to $C_8$ alkyl radicals, and —OCR wherein said R is the same as previously defined, said water displacing agent being soluble in water to the extent of 6 to 25 weight percent.

2. A rust inhibiting water displacing composition according to claim 1 wherein said water displacing agent is ethylene glycol diacetate.

3. A rust inhibiting water displacing composition according to claim 1 wherein said water displacing agent is present in amounts of about 1.0 to 5.0 parts by weight of the total composition.

4. A rust inhibiting water displacing composition according to claim 1 wherein R'' is hydrogen.

5. A rust inhibiting water displacing composition according to claim 1 wherein R'' is —OCR, said R being selected from the group consisting of hydrogen and methyl radicals.

6. A rust inhibiting water displacing composition according to claim 1 wherein R'' is an alkyl radical.

7. A rust inhibiting water displacing composition according to claim 1 which contains about 1 to 15 parts by weight of degras.

8. A composition according to claim 1 which contains about 1 to 40 parts by weight of wax.

9. A method for improving the effectiveness of mineral oil rust preventive compositions containing oil-soluble rust preventives selected from the group consisting of $C_{12}$ to $C_{22}$ fatty acid partial esters of aliphatic polyhydric alcohols having about 3 to 12 carbon atoms, alkali and alkaline earth metal salts of petroleum sulfonic acids, and alkyl aryl sulfonic acids having average molecular weights of about 350 to 520, when applied to wet metal surfaces which comprises incorporating into said rust preventive composition a water displacing amount about 0.1 to 10 parts by weight of a material having the general formula:

$$RCOO(R'O)_nR''$$

wherein R is selected from the group consisting of hydrogen and methyl radicals, R' is a $C_2$ to $C_4$ aliphatic hydrocarbon radical, $n$ is about 1 to 8, and R'' is selected from the group consisting of hydrogen, $C_1$ to $C_8$ alkyl radicals, and —OCR wherein said R is the same as previously defined.

References Cited in the file of this patent

UNITED STATES PATENTS

| 2,566,068 | Morgan et al. | Aug. 28, 1951 |
| 2,672,444 | Wasson et al. | Mar. 16, 1954 |
| 2,751,350 | Peeler et al. | June 19, 1956 |